June 30, 1970 J. L. KULP 3,518,559

PRECISION PHASE-AMPLITUDE DEMODULATOR USING TWO PAIRS OF TRANSISTORS WITH ISOLATION BETWEEN EACH PAIR

Filed Dec. 11, 1967

INVENTOR,
JOHN L. KULP

BY Harry M. Saragovitz, Edward J. Kelly, Herbert Berl & Julian C. Keppler
ATTORNEYS.

United States Patent Office 3,518,559
Patented June 30, 1970

3,518,559

PRECISION PHASE-AMPLITUDE DEMODULATOR USING TWO PAIRS OF TRANSISTORS WITH ISOLATION BETWEEN EACH PAIR

John L. Kulp, Palo Alto, Calif., assignor, by mesne assignments, to the United States of America as represented by the Secretary of the Army

Filed Dec. 11, 1967, Ser. No. 700,340
Int. Cl. H03d *1/06*
U.S. Cl. 329—101 5 Claims

ABSTRACT OF THE DISCLOSURE

An apparatus for obtaining accuracy greater than 0.1% in the demodulation of an AC carrier. Four transistors form two switches which are connected to an amplifier through a resistance. The amplifier output is fedback to the output of each switch. The isolation of the two switches from each other and from the load produces the desirable consequences.

Background of invention

This disclosure relates generally to precision modulation and demodulation and more particularly to precision demodulation accomplished by a switching, phase-amplitude demodulator composed of transistors. In the past it has been difficult if not impossible to achieve precision demodulation with accuracy on the order of 0.1% unless servos were used. A statement to this effect may be found in Control Engineers Handbook by Truxal, McGraw-Hill, 1958 on pages 6–66. Other circuits overcome the bulk of numerous servo systems by using connections of two, four or eight transistors to form a switching demodulator. Two transistor phase detectors are limited by the amount of driving voltage since if the input exceeds a particular value the transistor will no longer block. Four transistor circuits used in the prior art do not possess the required degree of accuracy. In addition prior art circuits are limited by a small linear dynamic range and hysteresis which occurs when going from one polarity to another or from high to low signals. A discussion of prior art systems may be found in the Handbook of Semiconductor Electronics by Hunter, McGraw-Hill, 1956, pages 16–27. The present invention solves these problems and obtains the following results: precision demodulation of AC carrier or modulated carrier with accuracy greater than 0.025%, a linear amplitude characteristic with a range of greater than 100 db and drift less than 10 pulses per minute per degree centigrade at full scale, and no hysteresis under changing signal conditions.

Summary of invention

The general purpose of the invention is to provide a demodulator which embraces all the advantages of similarly employed devices and possesses none of the disadvantages. To obtain this, the present invention contemplates the use of two switches, each having two series connected transistors. The output from each switch is connected by a resistor to an amplifier. The basic detector is provided with feedback from the amplifier output to the output of each of the above mentioned switches. Also, the reference square wave is connected to each of the four transistors through separate transformers.

Description of drawing

The exact nature of this invention will be readily apparent from consideration of the following specification relating to the annexed drawing in which.

Description of preferred embodiment

Figure 1:
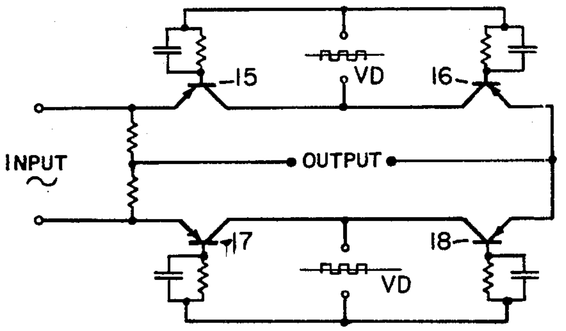
FIG. 1 PRIOR ART
FIG. 1 shows a prior art switching demodulator composed of four transistors.

Referring now to the drawings, there is shown in FIG. 1, a prior art four transistor phase-sensitive detector. Transistors 15 and 16 form one AC switch and transistors 17 and 18 form a second AC switch. By using these two AC switches instead of two single transistors the input voltage can be allowed to exceed the driving voltage $V_d$. Consider for a moment that the AC switches are single transistors connected collector to collector directly and base to base via a voltage divider transformer. Then the square wave applied to the transformer establishes the phase reference. When one of the transistors is conducting (depending on the instantaneous polarity applied to the bases) a circuit will be completed through the conducting transistor, the load and the input. The current path will reverse and the opposite transistor will conduct on the next half cycle. Thus, if the input is a sine wave whose zero crossings correspond with the square wave reference, the load voltage will be a full-wave rectified sine wave whose polarity reverses when the input phase changes by 180°. If the input voltage exceeds the square wave driving voltage the transistors will no longer block. By using the two AC switches rather than the two transistors this restriction on the input voltage is eliminated. Since the voltage $V_d$ applied to transistors 15 and 16 is of the same polarity the switch will block even if the input should exceed the drive voltage $V_d$. The polarity applied to 17 and 18 is opposite to that applied to 15 and 16 and is synchronized with it so that it will be unblocked.

Figure 2:
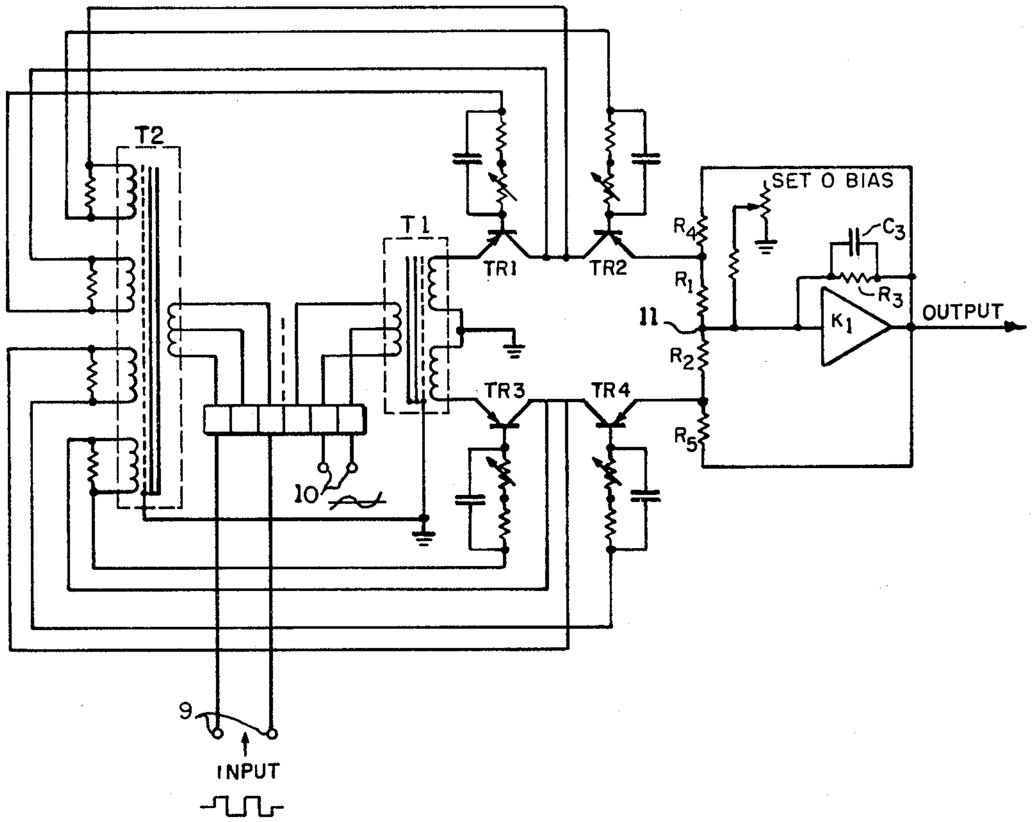
FIG. 2 shows a preferred embodiment of the present invention.

There is shown in FIG. 2 a phase-sensitive demodulator with a reference square wave input shown at 9. This is supplied through a transformer to the base-collector circuits of transistors TR1, TR2, TR3 and TR4. The use of the transformer T2 to supply the square wave reference to the emitters is merely a convenient method of synchronizing the polarity of input to switches TR1–TR2 and TR3–TR4 respectively. An input in the form of a sine wave 10 is supplied via transformer T1 to the emitter circuit of transistors TR1 and TR3. This sine wave signal is the signal to be demodulated and is supplied via transformer T1 for convenience. It could be supplied directly as in the prior art circuit of FIG. 1. All this is in the conventional manner. The signals obtained at the emitters of TR2 and TR4 are fed through resistors R1 and R2 respectively to the input of amplifier K1. The demodulated signal at the output of K1 is used in the conventional manner and is also fed back through resistors R4 and R5. In the basic circuit in which the switches are connected to each other and to a filter with a time constant to remove ripple, any voltage present in the filter capacitors can back discharge through the transistors and cause variable zero offsets. This error can be as large as 0.5%. By isolating the demodulator by means of an amplifier the hysteresis effect is removed but the dynamic range is not increased; in effect it is slightly reduced since large switching transients make it necessary to operate below the maximum output capabilities of the amplifier. Since the "on" switch (either TR1 and TR2 or TR3 and TR4 is saturated and at a very low resistance and the signal AC input impedance is small, direct feedback through a resistance from the amplifier output will have little effect on the "on" switch except to reduce the amplitude of the switching spike. At the "off" switch, the inverting amplifier K1 feedback makes more constant the voltage drop across the "off" switch, since it is of the same polarity and phase as the input signal at that switch's input. It also decreases the net voltage across that switch by the amount of the feedback. Since this feedback signal is also applied to the summing junction 11 through resistors R1 or R2, it decreases the net gain; also reducing any non-linearity in the amplifier. The range of signal which can be linearly demodulated is, however, increased since the leakage characteristics of the transistors are more invariant with changing signal conditions. The linear dynamic range is also increased since the "off" switch does not have to block the voltage difference between the "on" output and the AC input voltage to the "off" switch, but only the AC input since the resistors are effectively at ground potential when the switch is off.

The addition of capacitor C3 across resistor R3 is to remove a phase non-linearity by providing a lead in the feedback loop at frequencies near the roll-off point of the amplifier. It is here that variable step rises in the demodulator switch output have components above the response and therefore would otherwise cause full-scale spikes in the output. Various modifications are contemplated and may obviously be resorted to by those skilled in the art without departing from the spirit and scope of the invention. For example, a more sophisticated circuit for the demodulator eliminates the input transformer without loss in gain through the use of operational inverters in the output.

What is claimed is:

1. A precision demodulator circuit comprising:

a first switch, consisting of two transistors of like conductivity type;

a second switch, consisting of two transistors of the same conductivity type as those of said first switch;

a modulated signal input connected to the input of said first and second switches;

an amplifier having an input and an output, said input connected to said outputs of said first and second switches;

a first feedback resistor connected from the amplifier output to the output of said first switch; and a second feedback resistor connected from the amplifier output to the output of said second switch.

2. The circuit of claim 1 further including: a phase lead network connected from the amplifier output to the amplifier input to prevent the occurrence of voltage spikes in the amplifier output.

3. The device of claim 2 in which the switch inputs are supplied by way of an input transformer.

4. The device of claim 3 further including: bias means to set a zero voltage at the amplifier input.

5. The device of claim 4 in which said bias means comprises:

a third resistor connected between the first switch output and the amplifier input;

a fourth resistor connected between the second switch output and the amplifier input; and a fifth resistor which is adjustable connected to a point between the third and fourth resistors.

References Cited

UNITED STATES PATENTS

| | | | |
|---|---|---|---|
| 3,075,150 | 1/1963 | Berman et al. ---- | 329—101 X |
| 3,346,697 | 10/1967 | Kitsopoulos ------ | 330—103 X |
| 3,366,804 | 1/1968 | Heaviside -------- | 307—241 X |
| 3,378,779 | 4/1968 | Priddy ---------- | 329—169 X |

OTHER REFERENCES

Walton: "Isolated Input Data Acquisition Amplifier," IBM Tech. Disclosure Bulletin, vol. 8, No. 6, pp. 847–848, November 1965.

ALFRED L. BRODY, Primary Examiner

U.S. Cl. X.R.

307—241; 329—170, 192; 330—10